UNITED STATES PATENT OFFICE 2,665,385

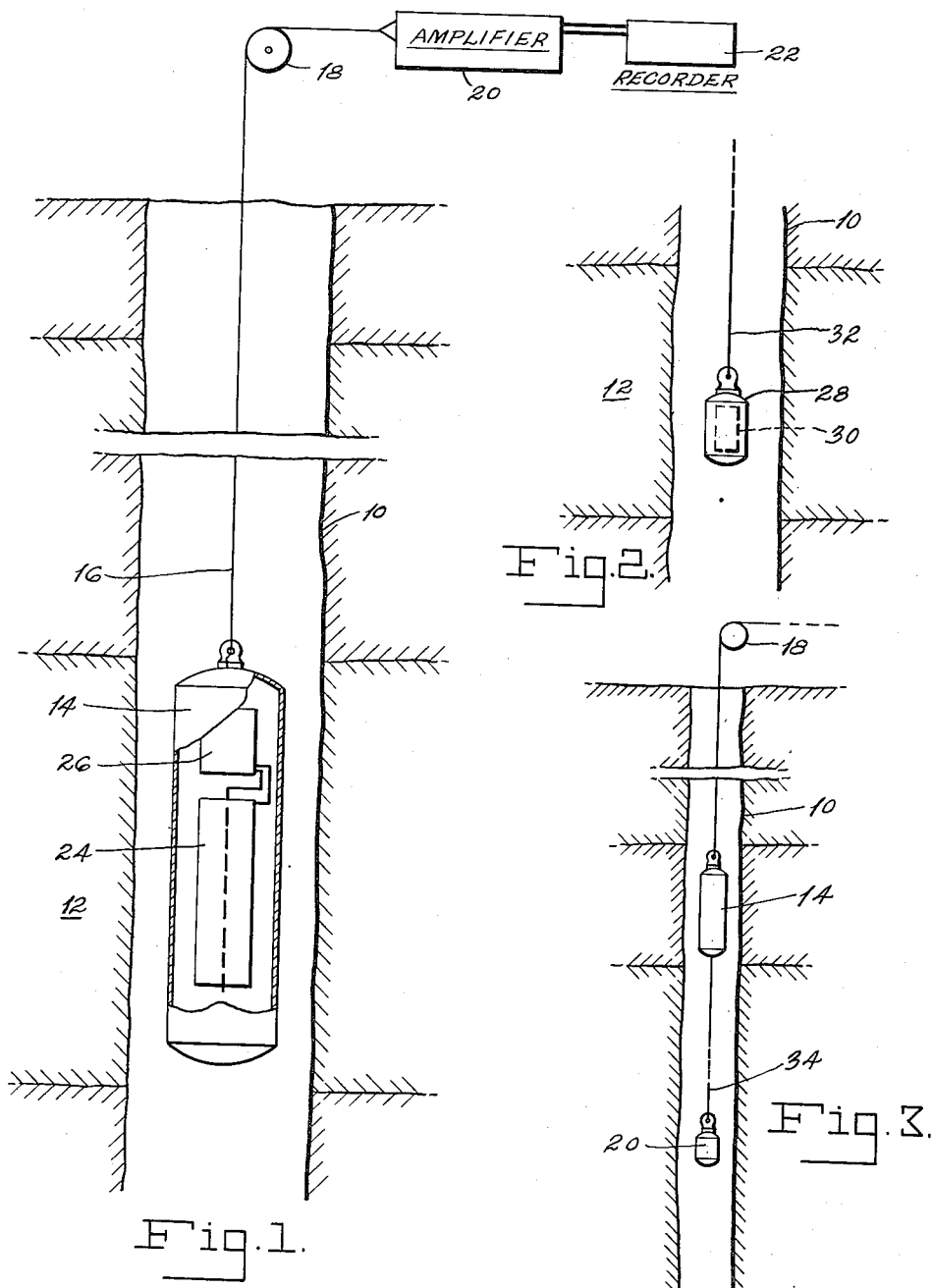

RADIOACTIVITY WELL LOGGING

Gerhard Herzog, Houston, Tex., assignor to The Texas Company, New York, N. Y., a corporation of Delaware Application December 29, 1948, Serial No. 67,822

1 Claim. (Cl. 250—83)

This invention relates to the logging of bore holes or wells by radioactivity and more particularly to a method of investigating or analyzing a particular formation traversed by the bore hole so that a determination can be made as to its main constituents, for example, whether it consists primarily of sand or primarily of limestone. With this method an indication can also be obtained as to whether a sand formation contains salt water or hydrocarbons. The principal object of the invention is to provide a method whereby these results can be obtained in a fairly simple manner and without danger of permanently contaminating the bore hole by forcing into the formations any radioactive substance having a long lifetime.

A gamma ray log of the natural radioactivity in a bore hole will show high and low intensities depending on the characteristics of the formations through which the radiation detector passes. On such a log it is comparatively easy to discriminate between shales on the one hand and limestone or sands on the other since shales in general have a high radioactivity whereas limestones and sands show a low radioactivity. However, it is not possible from a gamma ray log to distinguish clearly between sands and limestones. In accordance with the method to be described, limestones and sands may be distinguished from each other.

It is known that if a substance is bombarded with neutrons over an extended period, the substance may or may not become artificially radioactive. In other words, after the neutron bombardment has ceased and the neutron source has been removed, if the substance spontaneously emits radiation, the intensity and type of the emitted radiation will be characteristic of the substance. The gamma rays which are emitted by the artificially radioactive substances in general have appreciable energy and sufficient penetration so that they can be measured even in a bore hole provided with a casing. Substances can further be identified by the lifetime of the artificial radioactivity produced. By "lifetime" is understood, of course, the decay time which is required until approximately 37% of the original radioactive substance remains and the lifetimes for different substances vary, as is well known, from a few seconds to many months.

Experiments have shown that after dry sand had been exposed to neutrons no gamma rays could be detected which were caused by this exposure or bombardment. However, when dry limestone was bombarded a fairly strong gamma ray intensity was detected after the neutron source had been removed and the decay or rate of decrease in this intensity was such as to indicate that the artificially radioactive substance was limestone.

Further experiments have shown that if fresh water and crude oil are bombarded with neutrons no delayed gamma rays can be detected which are caused by this bombardment. When limestone was saturated with either fresh water or crude oil and the experiment repeated, a rather strong gamma ray activity was found which is due, of course, only to the limestone. When sand saturated with either fresh water or oil was bombarded no induced radioactivity was noted.

In carrying out this invention in one of its applications a neutron source is lowered into the well or bore hole opposite the formation which is to be investigated and which is known, for instance, to consist of fresh water sand or dry limestone. After the necessary bombardment time the source is moved sufficiently far away from the formation being studied that the primary neutrons or gamma rays emitted by the source will not affect subsequent readings. A gamma ray detector is then put in the place formerly occupied by the source. If the gamma ray intensity then measured is appreciably higher than the intensity at the same location before the neutron bombardment, it can be assumed that the formation consists of limestone rather than sand. This observation can be checked by noting the decrease of the intensity of the radiation with time. If this decrease indicates the lifetime for limestone one can be quite certain that the formation actually consists of limestone. If the formation to be investigated is known to be a fresh water sand or limestone in which fresh water is present, delayed gamma ray activity after bombardment with neutrons will also indicate limestone rather than sand.

Another application of this analysis by neutron bombardment is a determination as to whether a sand contains salt water or hydrocarbons. This is obviously an important question from many standpoints. For example, when it is desired to perforate a casing one could determine the exact position of the interface between salt water and oil and then perforate at the proper depth. When salt water was bombarded with neutrons an appreciable gamma ray activity was noted after the bombardment, this activity decreasing with a lifetime indicating that salt had been made artificially radioactive. When ordinary salt, NaCl, is bombarded with neutrons, gamma rays having two lifetimes are subsequently emitted, i. e., gamma rays having energies of 1.4, 2.0 and 3.0 m. e. v. decreasing due to a lifetime of sodium of 14.8 years, and gamma rays having energies of 1.7 and 2.0 m. e. v. decreasing due to a lifetime of chlorine of 37 minutes. (See M. S. Livingston and H. R. Bethe's "Nuclear Dynamics, Experimental" in Review of Modern Physics, vol. 9, p. 346, 1937; and Applied Nuclear Physics by E. Pollard and W. L. Davidson, Jr., p. 214, published in 1942 by John Wiley and Sons, Inc.) Since crude oil after neutron bombardment does not show a gamma ray activity, this difference of the behavior between crude oil and salt water is sufficiently large for this method to be practical for the discrimination between salt water sands and oil sands. Thus, if one knows that a sand in a certain area contains either salt water or hydrocarbons and a section of this sand shows, after bombardment, a gamma ray intensity which decreases according to a lifetime for radioactive salt, one can be certain that it contains salt water. If, however, the section, after bombardment, does not show induced gamma ray activity or activity having the lifetime of salt, it is safe to conclude that it contains hydrocarbons.

For a better understanding of the invention, reference may be had to the accompanying drawing in which Figure 1 is a vertical elevation through a bore hole showing a device suspended within the hole for measuring induced gamma rays, Figure 2 is a similar vertical elevation showing a neutron source suspended within the hole for bombarding the adjacent formation, and Figure 3 is a somewhat schematic vertical elevation showing a modification.

Referring to Figure 1 of the drawing a bore hole 10 is shown as penetrating several formations such as the one indicated at 12. Within the hole 10 is shown an instrument having a housing 14 suspended by means of a cable 16, the cable passing over a cable measuring device 18 and leading to a suitable amplifier 20 and an indicating meter or recorder 22 at the surface. Within the housing 14 is a radiation detector 24 which may be of the gamma ray counter type, the output of which is connected to a suitable preamplifier 26 which in turn is connected through the cable 16 to the main amplifier 20 at the surface.

In Figure 2 is shown a section of the hole 10 and suspended therein a small housing 28 containing a suitable neutron source 30 which may comprise a mixture of radium and beryllium. The housing 28 is also suspended as by means of a wire line 32 leading to the surface.

Assuming it is known, from a previous natural gamma ray survey, for instance, that the formation 12 is either a sand or limestone, the neutron source 30 will be lowered into the hole opposite that formation and suspended there for a period sufficient to assure build-up of radio-activity and during this time the formation 12 will be bombarded by the neutrons from the source. The source will then be removed by means of the cable line 32 and the detecting instrument 14 lowered to the same position within the formation 12. Gamma rays which may have been induced within the formation due to the neutron bombardment will be detected by the instrument 24 the output of which will be preamplified at 26 then passed over the cable 16 to the amplifier 20 and then to the recording device 22. If an appreciable gamma ray activity is indicated at the recorder 22 one can be fairly safe in assuming that the formation 12 is a salt water sand or limestone. Conversely, if substantially no increase in gamma ray activity is indicated then the formation is in all probability a fresh water sand. As stated above, the detecting device can be left in position opposite the formation 12 for a sufficient length of time to determine the lifetime of the substance made radio-active by the neutron bombardment and if the decrease in activity indicates the lifetime of limestone then one can be quite certain that limestone comprises the formation being investigated.

It is, of course, necessary that after bombardment of a formation the neutron source be removed so that subsequent measurements of possible induced radioactivity in that formation will not be affected by the source. Although the source can be suspended in and removed from the bore hole on a separate wire line as shown at 32 in Fig. 2, the delay caused by withdrawing the source and then lowering the measuring instrument can be substantially avoided by suspending the source on a length of wire line 34 from the lower end of the detector housing as shown in Fig. 3. The wire line should, of course, be of sufficient length to hold the source so that the neutrons therefrom will not strike the detector. In many cases neutron sources also simultaneously emit gamma rays and the length of the wire line 34 should be sufficient, of course, to eliminate the effect of these gamma rays on the detector. After the formation 12 has been bombarded for a sufficient time, the cable 16 will be lowered so as to bring the detector 14 into the position formerly occupied by the source 20.

If it is known that the formation 12 contains either salt water or oil and that the formation is a sand, then the formation can be bombarded as described above followed by a measurement of the increased radioactivity, if any, of the formation. If there is no increase in activity it can be assumed that the formation contains oil and if there is a substantial increase then it can be assumed that the formation contains salt water. If the measurement indicates a lifetime for radioactive salt then one can be certain that salt water is the liquid contained in the formation.

Summarizing, if it is known only that the formation 12 is either a sand or limestone but it is not known whether it contains salt water or oil, and after bombardment no delayed gamma radioactivity is found one can assume the formation is a sand containing oil. If, after bombardment, a delayed gamma radioactivity is noted, then sand containing salt water, or limestone containing salt water or oil is indicated. In this case, measurements of the rate of decrease in the induced radioactivity will show either (1) a lifetime of salt alone, indicating sand containing salt water; (2) a lifetime of limestone alone, indicating limestone containing oil or (3) lifetimes both for limestone and for salt, indicating that the formation is limestone containing salt water.

It can be seen, therefore, that with this method a determination can be made as to whether a formation is sand or limestone and in either case whether it contains oil or salt water.

The described method is also obviously applicable for the determination of other substances in a formation traversed by a bore hole. Thus, after neutron bombardment of the formation the presence of various elements such as aluminum, magnesium, iron, etc., can be ascertained by noting the presence or absence of delayed or induced gamma radioactivity together with the rate of decrease of such radioactivity, if any, indicating a lifetime or lifetimes for any of these elements, or others.

Further detail in analysis may be obtained by selectively bombarding a formation with either slow or fast neutrons and by observing the corresponding induced gamma ray intensities and their decay.

Obviously many modifications and variations of the invention, as hereinbefore set forth, may be made without departing from the spirit and scope thereof, and therefore only such limitations should be imposed as are indicated in the appended claim.

I claim:

The method of distinguishing between a sand and a limestone formation traversed by a well bore hole which comprises bombarding said formation with neutrons from a source in said hole at a position opposite said formation for a period commensurate with the lifetime of radioactive limestone, moving the source to a second position remote from said first position so that said formation will be out of range of neutrons from the source and then, from said first position, measuring over a time of the same order as said period the intensity of any radioactivity induced in the formation by said previous bombardment to determine if the said intensity decreases during at least a portion of said measuring time according to a lifetime indicating that limestone was the substance made radioactive by said bombardment.

GERHARD HERZOG.

References Cited in the file of this patent

UNITED STATES PATENTS

| Number | Name | Date |
| --- | --- | --- |
| 2,303,688 | Fearon | Dec. 1, 1942 |
| 2,308,361 | Fearon | Jan. 12, 1943 |
| 2,463,733 | Albaugh | Mar. 8, 1949 |
| 2,476,810 | Brunner et al. | July 19, 1949 |